(12) United States Patent
Terre et al.

(10) Patent No.: US 6,958,478 B2
(45) Date of Patent: Oct. 25, 2005

(54) MICROBOLOMETER DETECTOR WITH HIGH FILL FACTOR AND TRANSDUCERS HAVING ENHANCED THERMAL ISOLATION

(75) Inventors: William A. Terre, Santa Barbara, CA (US); James T. Woolaway, Goleta, CA (US); Hubert Jerominek, Sainte Foy (CA); Christine Alain, Quebec (CA)

(73) Assignee: Indigo Systems Corporation, Goleta, CA (US)

( * ) Notice: Subject to any disclaimer, the term of this patent is extended or adjusted under 35 U.S.C. 154(b) by 204 days.

(21) Appl. No.: 10/441,507

(22) Filed: May 19, 2003

(65) Prior Publication Data

US 2004/0232335 A1 Nov. 25, 2004

(51) Int. Cl.[7] ............................................. H01L 31/02
(52) U.S. Cl. ................................. 250/338.2; 250/338.4
(58) Field of Search ......................... 250/338.2, 338.4, 250/332, 349, 370.06, 370.08

(56) References Cited

U.S. PATENT DOCUMENTS

| | | | |
|---|---|---|---|
| 5,220,188 A | 6/1993 | Higashi et al. | |
| 5,220,189 A | 6/1993 | Higashi et al. | |
| 5,286,976 A | 2/1994 | Cole | |
| 5,293,041 A | 3/1994 | Kruse, Jr. | |
| 5,367,167 A | 11/1994 | Keenan | |
| 5,420,419 A | 5/1995 | Wood | |
| 5,449,910 A | 9/1995 | Wood et al. | |
| 5,450,053 A | 9/1995 | Wood | |
| 5,455,421 A | 10/1995 | Spears | |
| 5,534,111 A | 7/1996 | Hocker et al. | |
| 5,602,393 A | 2/1997 | Gerard | |
| 5,895,233 A | 4/1999 | Higashi et al. | |
| 6,036,872 A | 3/2000 | Wood et al. | |
| 6,144,030 A | 11/2000 | Ray et al. | |
| 6,201,243 B1 | 3/2001 | Jerominek | |
| 2004/0140428 A1 * | 7/2004 | Ionescu et al. | .......... 250/338.1 |

* cited by examiner

*Primary Examiner*—Otilia Gabor
(74) *Attorney, Agent, or Firm*—Silicon Valley Patent Group LLP

(57) ABSTRACT

In a microbolometer detector the individual transducers in the focal plane array are support by leg members that are attached to the underlying readout integrated circuit (ROIC) chip at locations underneath transducers other than transducer which they support. A variety of configurations are possible. For example, the leg members may be attached to the ROIC chip at locations under adjacent transducers on opposite sides or on the same side of the supported transducer, or at locations underneath transducers that are not immediately adjacent to the supported transducer. In this way the effective length of the leg members and therefore the thermal isolation of the transducer they support can be increased.

11 Claims, 10 Drawing Sheets

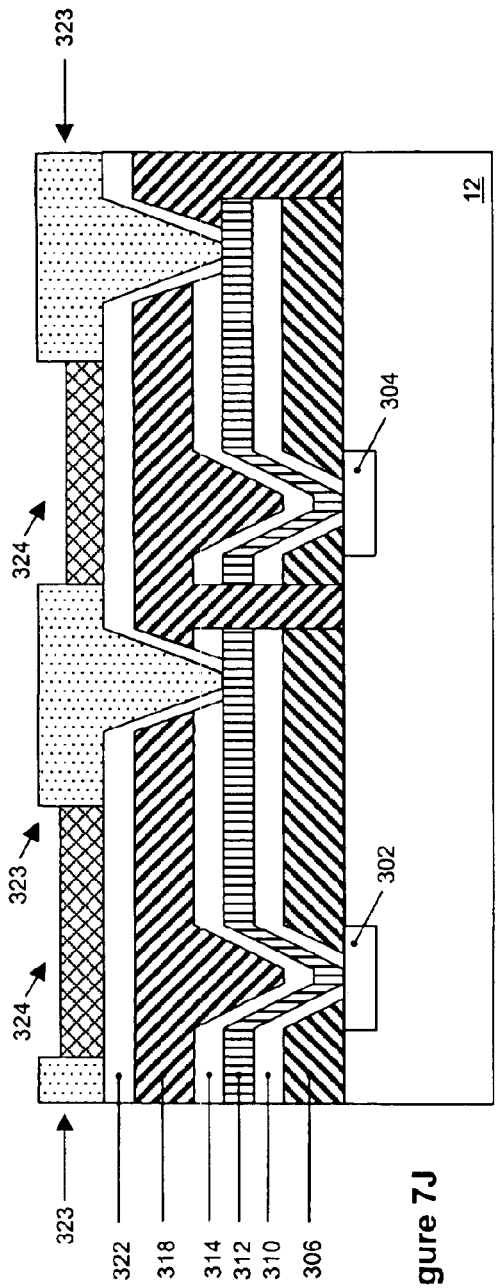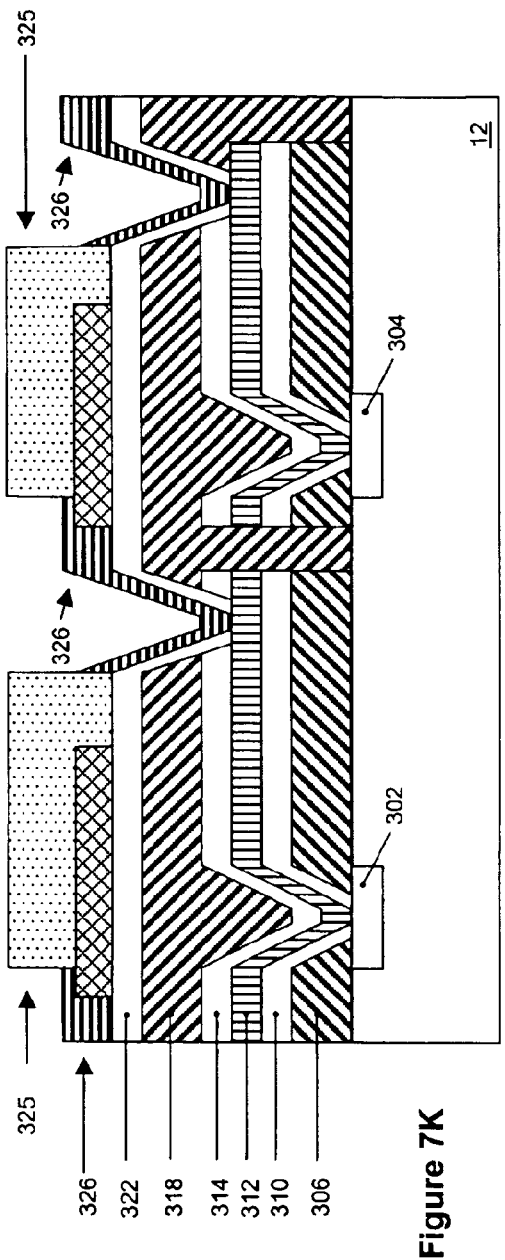

MICROBOLOMETER DETECTOR WITH HIGH FILL FACTOR AND TRANSDUCERS HAVING ENHANCED THERMAL ISOLATION

FIELD OF THE INVENTION

This invention relates to microbolometer detectors and in particular to a microbolometer detector for detecting infrared radiation wherein the transducer elements are highly thermally isolated from the readout integrated circuit chip.

BACKGROUND OF THE INVENTION

The general structure of microbolometer detectors is well known in the art. Briefly, they include a two-dimensional array of transducers, each of which is electrically connected to an underlying readout integrated circuit (ROIC) chip that contains circuitry for detecting changes in the resistance of the transducer. The array is often referred to as a "focal plane array" and the individual detectors are referred to as "pixels". The transducers are formed of a material, such as vanadium oxide, which has a high thermal coefficient of resistance (TCR). To isolate the transducers thermally, they are typically held by a structure that supports them in a suspended position over the ROIC chip. When radiation such as infrared radiation is incident on the transducers in the focal plane array, an image of the source of the radiation is generated.

Several criteria are important in determining the efficiency of a microbolometer detector. First, to increase the responsiveness and sensitivity of the individual transducers, it is important that the support structure isolate them thermally from the ROIC chip. Second, the support structure and transducer must occupy the same pixel area. Therefore, as the size of the pixels becomes smaller (e.g., to 25–50 $\mu$m) the support structure tends to take up more space of the pixel area, and a lower portion of the overall pixel area is occupied by the transducers themselves. The percentage of the pixel area that is occupied by the transducers is sometimes referred to as the "fill factor". To maintain a high quality image it is desirable to keep the fill factor as high as possible, preferably close to 100%.

U.S. Pat. No. 6,144,030 proposes one solution to these problems. Each transducer is supported by "leg members" that are located entirely beneath the transducer, and the individual leg members are formed in a "serpentine configuration" that increases the effective length of the leg members and hence the thermal isolation of the transducers. The fabrication of these serpentine structures, however, may require relatively dense photolithographic processing. This processing density may result in low yields. In addition, the effective length of the leg members, even when they are formed in a serpentine configuration, is limited by the area underneath the transducer.

SUMMARY OF THE INVENTION

In accordance with this invention, each transducer unit is supported by at least two leg members that are attached to the underlying ROIC chip at locations beneath other transducer members. This eliminates the necessity of fabricating serpentine or other complicated configurations in order to increase the effective length of the leg members and thereby increase the thermal isolation of the transducer units. Moreover, the length of the leg members is not limited by the area underneath a single transducer unit.

A variety of embodiments may be fabricated in accordance with this invention. The leg members may extend from locations underneath transducer units of opposite sides of the supported transducer unit. The leg members need not be attached to the ROIC chip at locations underneath adjacent transducer units but instead may originate at locations underneath transducer units that are further removed from the supported transducer unit. The leg members need not originate from locations on opposite sides of the supported transducer unit but may originate from locations underneath a transducer unit on the same side of the supported transducer unit, from locations underneath transducer units located at a right angle in relation to the supported transducer unit, etc. The leg members do not have to be straight but may contain transverse sections, serpentine configurations or other geometric patterns to increase the effect length of the leg members.

DESCRIPTION OF THE INVENTION

In arrangements according to this invention, the leg members that constitute the support structure for the transducer units extend under neighboring transducer units. Many alternative embodiments are possible.

Figure 1:
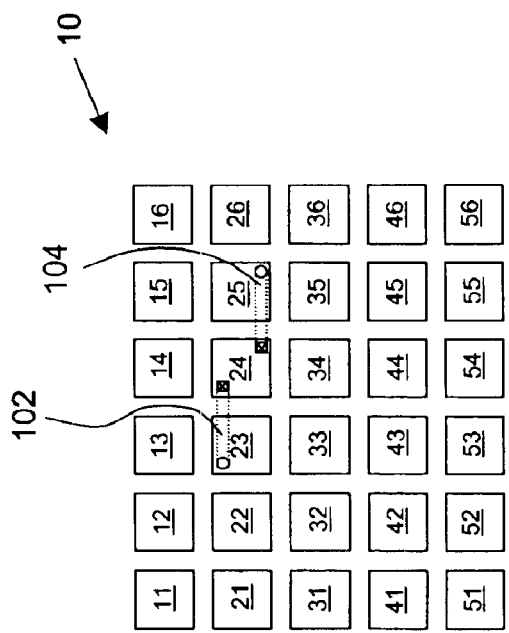
FIG. 1 is a top view of a rectangular focal plane array.

FIG. 1 is a top view of a focal plane array 10 which includes transducer units 11–16, 21–26, 31–36, 41–46 and 51–56. Focal plane array 10 is rectangular, although in other embodiments other geometries could be used. The separation between the transducer units is exaggerated for purposes of illustration. In reality, the transducer units could be closer together. Transducer unit 24 is shown as supported by a support structure that includes leg members 102 and 104. Leg member 102 extends from a location on the ROIC chip (not shown) beneath transducer unit 23 to a point of attachment on the transducer unit 24. Leg member 104 extends from a location on the ROIC chip beneath transducer unit 25 to a point of attachment on the transducer unit 24. (Note: In the drawings, the dashed lines represent the leg members, the circles denote a point of attachment on the ROIC chip, and the squares denote a point of attachment to the transducer unit.)

Figure 2:
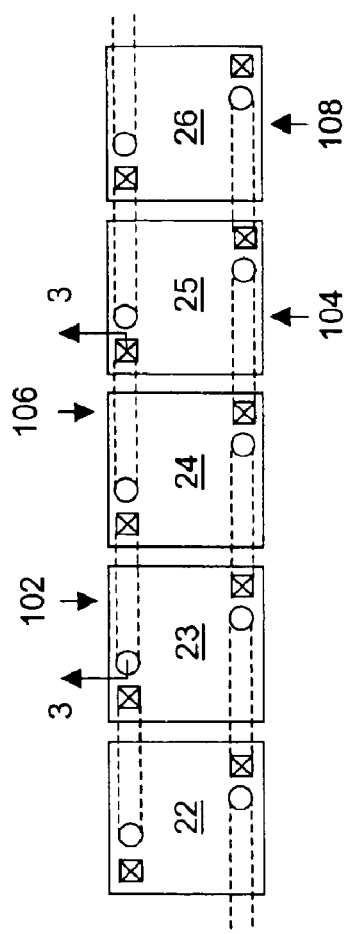
FIG. 2 is a detailed view of several of the transducer units of the array shown in FIG. 1, showing an embodiment wherein each of the transducer units is supported by leg members that extend from locations below the adjacent transducer units on opposite sides of the supported transducer unit.

FIG. 2 shows a close-up view of the structure shown in FIG. 1, with transducer units 22–26 and leg members 102 and 104. As shown, this pattern is repeated throughout array 10, with each transducer unit being supported by leg members that extend from underneath transducer units on opposite sides of the supported transducer unit. Thus transducer unit 25, for example, is supported by leg members 103 and 105 that extend from under transducer units 24 and 26, respectively.

Figure 3:
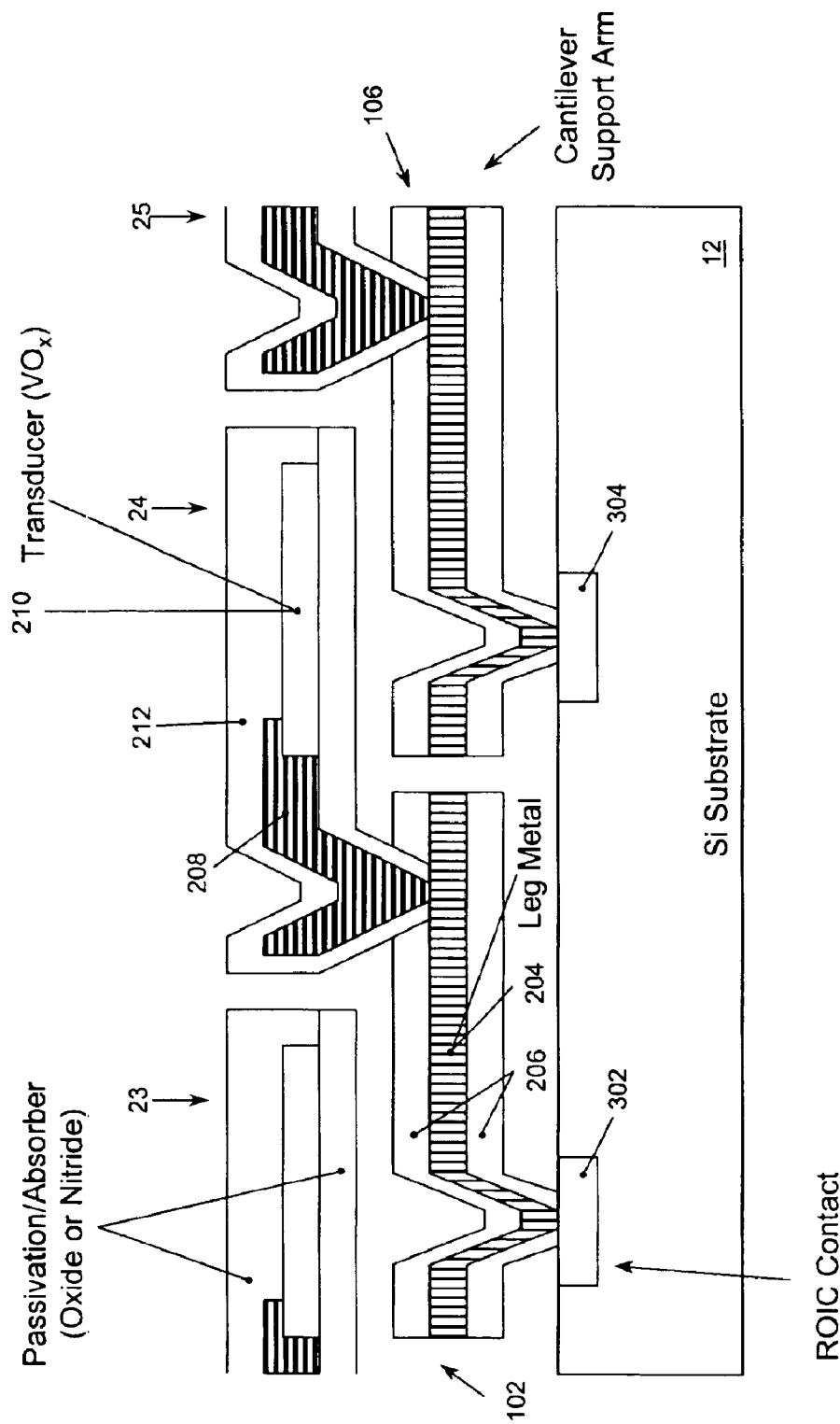
FIG. 3 is an elevational view of two of the transducer units taken at cross-section 3—3 shown in FIG. 2

FIG. 3 is an elevation view taken at cross-section 3—3 shown in FIG. 2, showing leg members 102 and 106 extending from an ROIC chip 12 to transducer units 24 and 25, respectively. FIG. 3 also shows some of the details of the structures of the leg members and the transducer units. For example, leg member 102 contains an electrical path 204, typically formed of nichrome, titanium or vanadium that extends from a contact 302 at an appropriate point on ROIC chip 12 to a contact 208 on transducer unit 24. Electrical path 204 is encased in an insulating film 206 that is typically made of silicon dioxide or silicon nitride. Contact 208 makes electrical contact with a transducer 210 within transducer unit 24, which is typically formed of vanadium oxide. Transducer 210 is encased in an absorber 212 that is made of silicon dioxide or silicon nitride. Leg member 106 and transducer unit 25 and the other leg members and transducer units in array 10 contain similar components. It should be understood, however, that this invention is not limited to any particular form of leg member or transducer unit. Other embodiments may include leg members and transducer units having structures different from those shown in FIG. 3.

Figure 4:
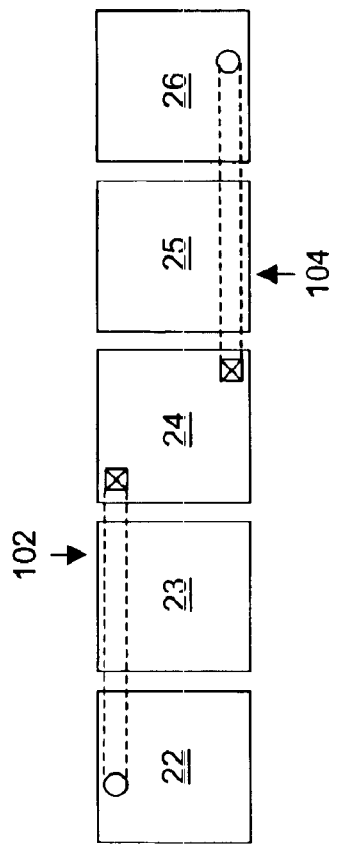
FIG. 4 is a detailed view of several of the transducer units of the array shown in FIG. 1, showing an embodiment wherein each of the transducer units is supported by leg members which extend from locations below transducer units that are separated from the supported transducer unit by intervening transducer units.
Figure 5:
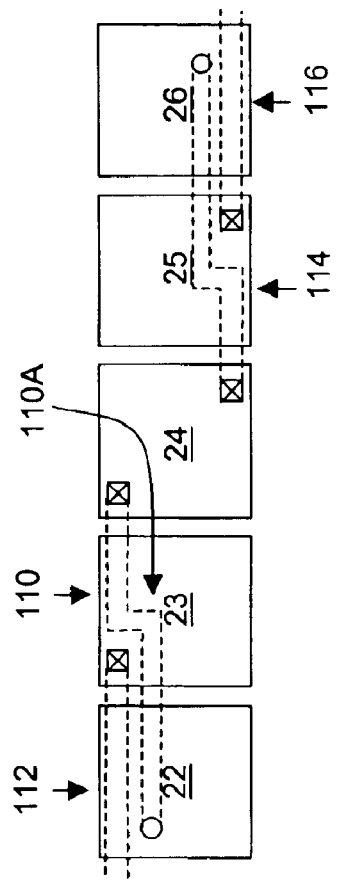
FIG. 5 is a detailed view of an embodiment that is similar to the embodiment shown in FIG. 4, except that each of the leg members contains a transverse section to avoid vertical interference with other leg members. In addition to avoiding the interference, the transverse section increases the leg length which in turn provides for increased thermal isolation.
Figure 6:
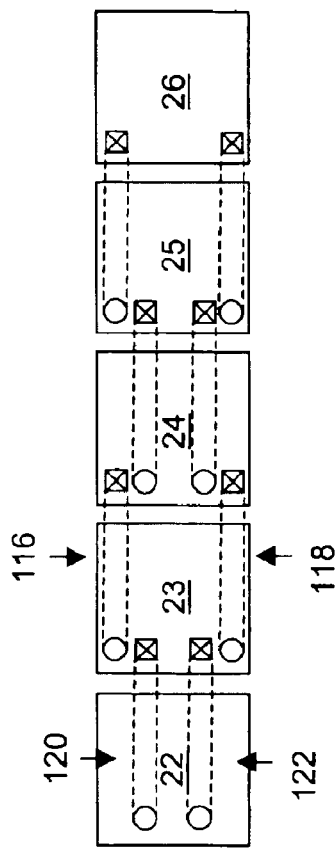
FIG. 6 is a detailed view of several of the transducer units of the array shown in FIG. 1, showing an embodiment wherein each of the transducer units is supported by leg members that extend from locations below a single adjacent transducer unit.

Several alternative embodiments are shown in FIGS. 4, 5 and 6.

FIG. 4 illustrates that the leg members need not originate under an adjacent transducer unit. In FIG. 4, leg member 106 extends from a location underneath transducer unit 22 to a point of attachment on the underside of transducer unit 24; transducer units 22 and 24 being separated by transducer unit 23. Similarly, leg member 108 extends from a location underneath transducer unit 26 to a point of attachment on the underside of transducer unit 24, transducer units 24 and 26 being separated by transducer unit 25.

In some cases it may be difficult to maintain vertical clearance between the leg members, particularly in embodiments such as the one shown in FIG. 4 where the leg member do not originate under an adjacent transducer unit. To overcome this problem, the leg members can be structured as shown in FIG. 5. Leg member 110, which is functionally similar to leg member 106 and supports transducer unit 24, contains a transverse section (e.g., section 110A in FIG. 5) perpendicular to the main direction of the leg member to prevent interference with the leg member (leg member 112) that supports the adjacent transducer unit. In addition, the transverse portion of leg member 110A provides for a longer path length, This longer path length provides for greater thermal isolation which results in a higher performance detector.

In the embodiments shown in FIGS. 2, 4 and 5 the leg members that support a particular transducer unit originate from opposite sides of that transducer unit. FIG. 6 shows another alternative embodiment wherein the leg members that support each transducer unit extend from the same side of the supported transducer unit and originate under the same transducer unit. For example, leg members 116 and 118, which support transducer unit 24, extend from under transducer unit 23. Leg members 120 and 122, which support transducer unit 23, extend from under transducer unit 22. To avoid a vertical clearance problem the leg members can be offset with respect to each other as shown in FIG. 6.

The embodiments shown in FIGS. 2, 4, 5 and 6 are not limiting. Each leg member that supports a given transducer unit may originate under any other transducer unit, whether or not the other transducer unit is in the same row or column of the array as the supported transducer unit, and whether or not the other transducer unit is adjacent to the supported transducer unit or is separated from the supported transducer unit by one or more intervening transducer units. Moreover, the leg members do not need to be straight, as shown in FIGS. 2, 4 and 6. The leg members may contain transverse sections, as shown in FIG. 5, or other configurations such as serpentine segments.

Figure 7A:
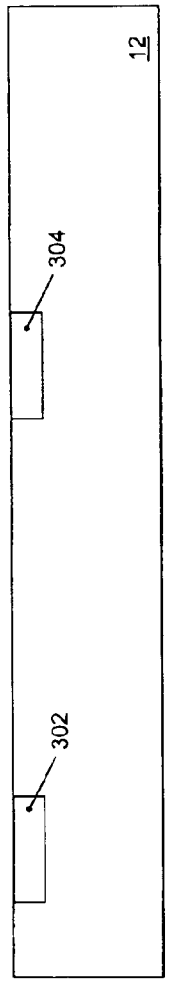
FIGS. 7A–7N illustrate a process for fabricating the transducer and leg members shown in FIG. 3.
Figure 7B:
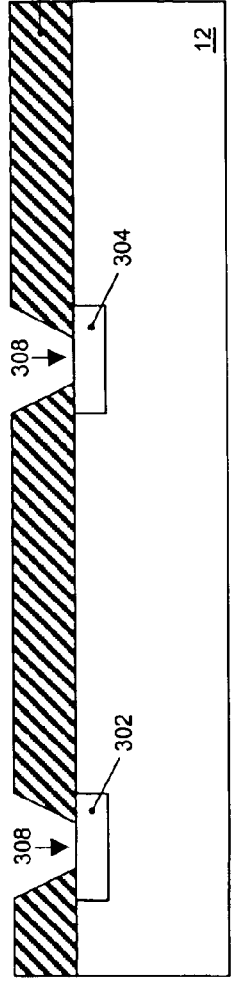
Figure 7C:
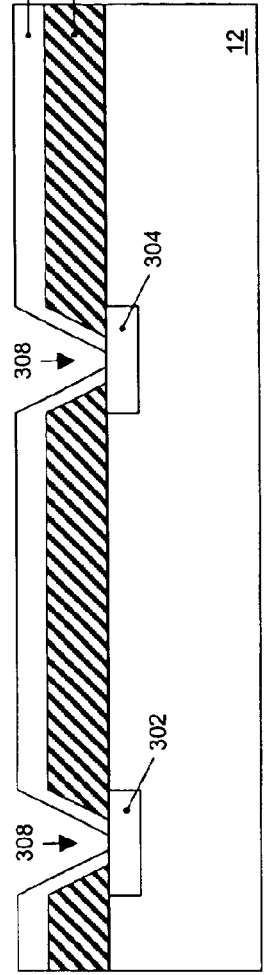
Figure 7D:
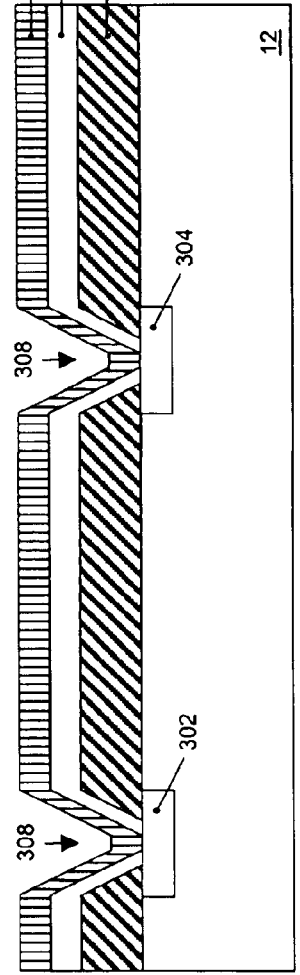
Figures 7E, 7F, 7G:
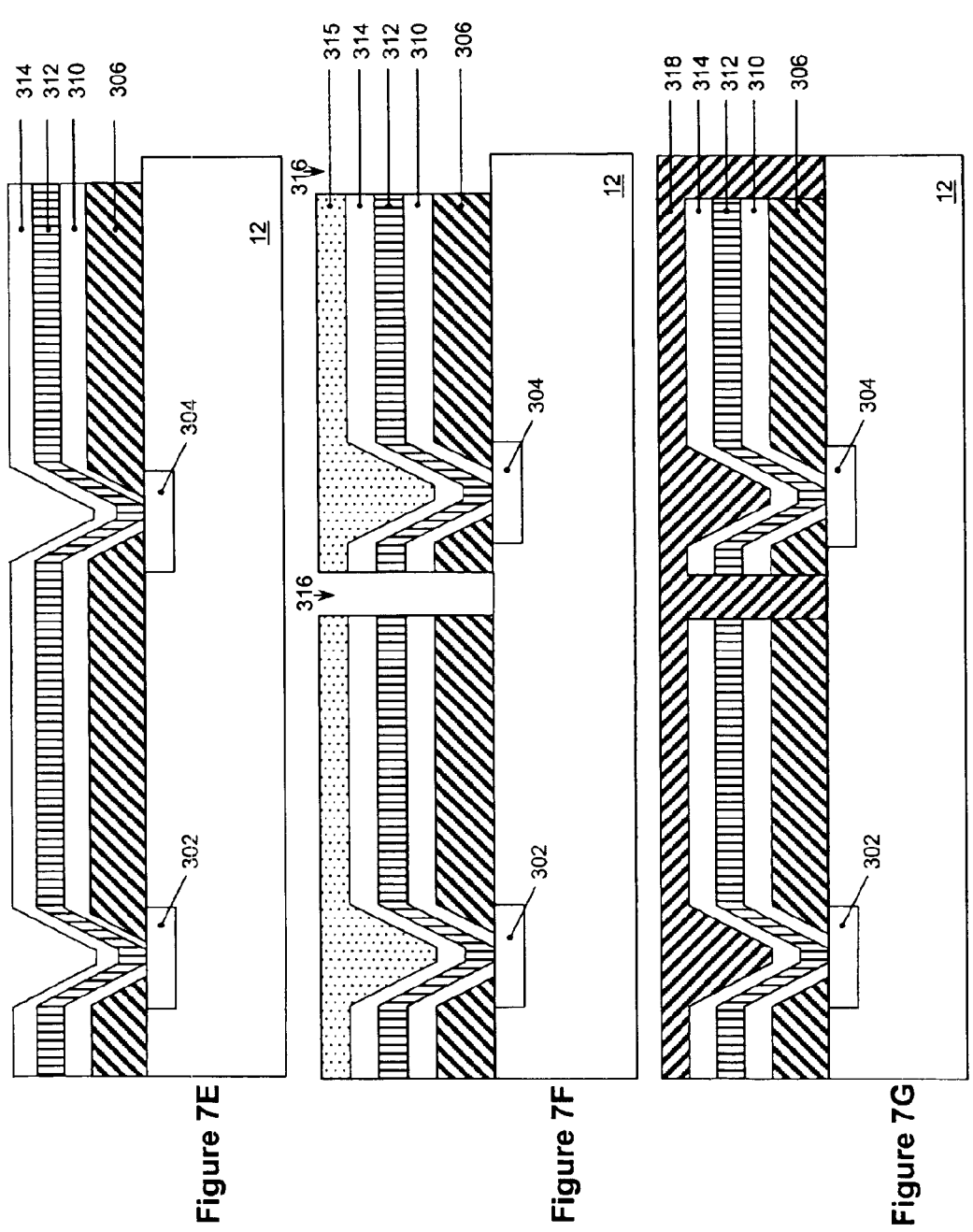
Figure 7H:
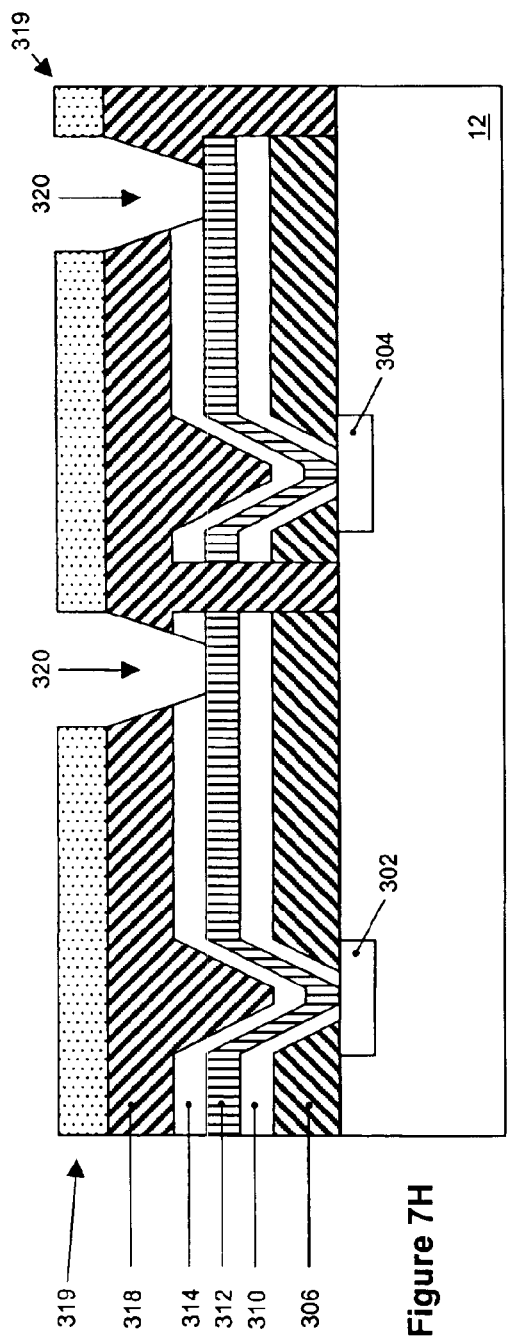
Figure 7I:
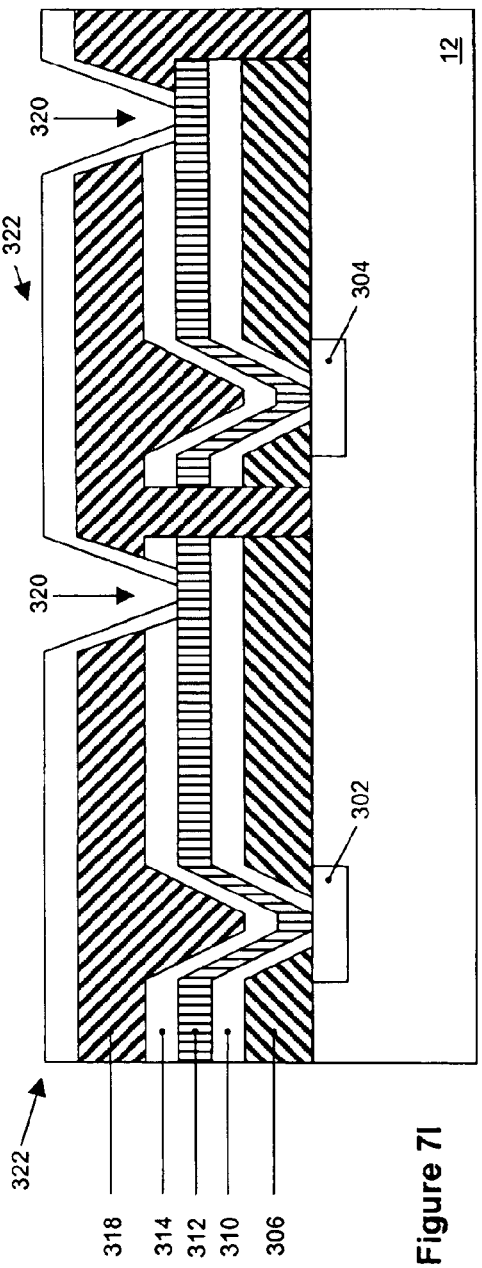
Figure 7L:
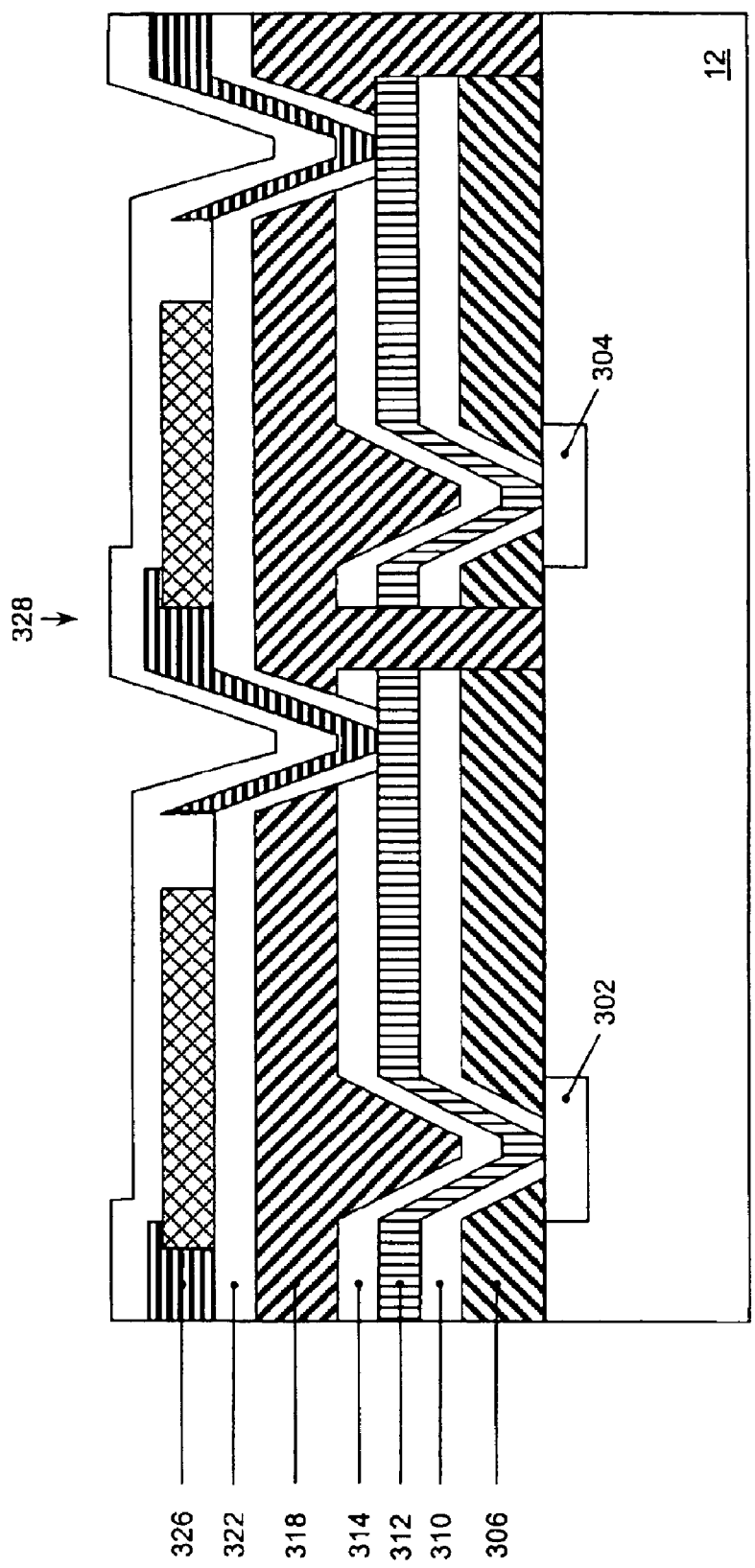
Figure 7M:
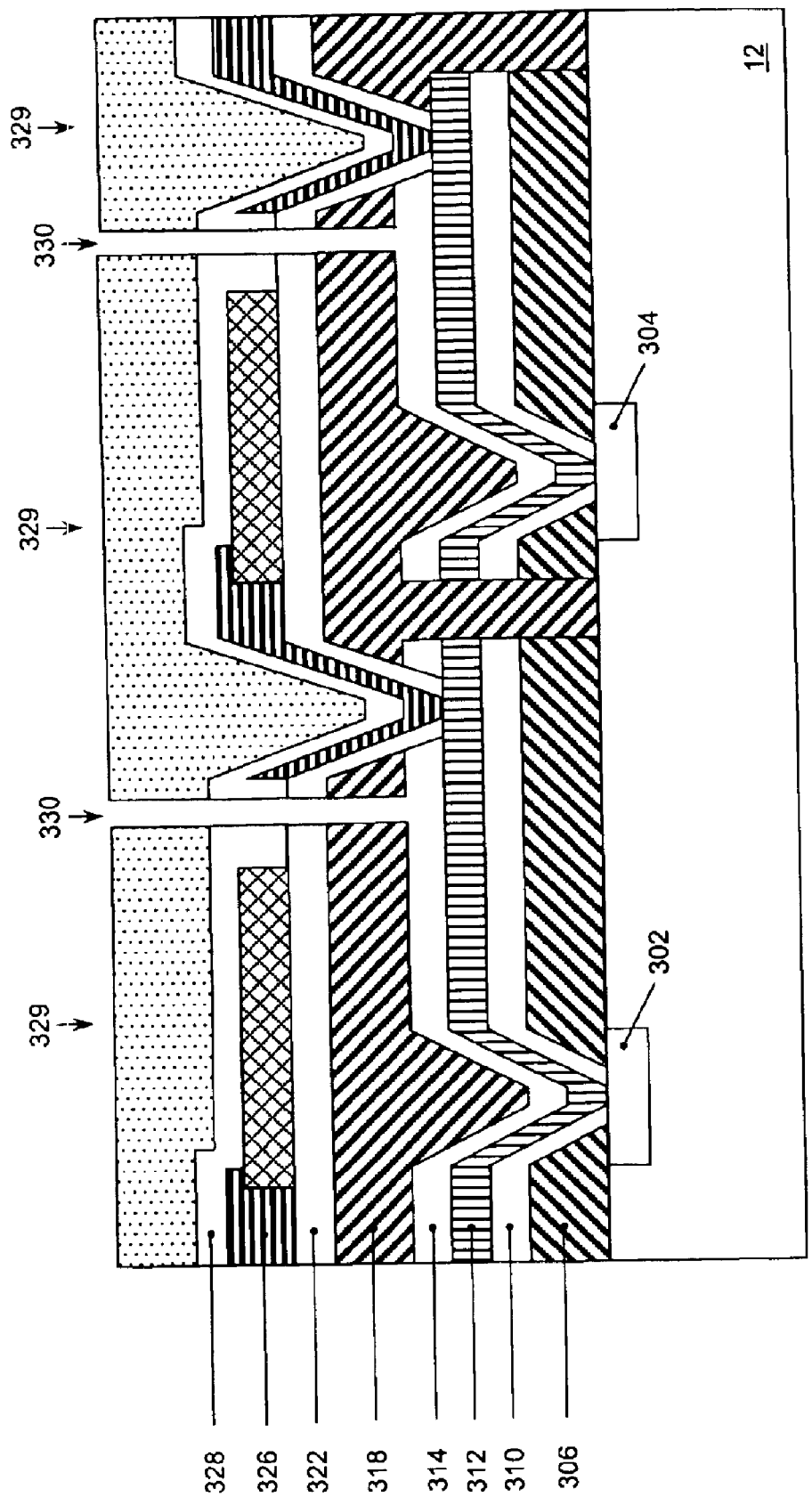
Figure 7N:
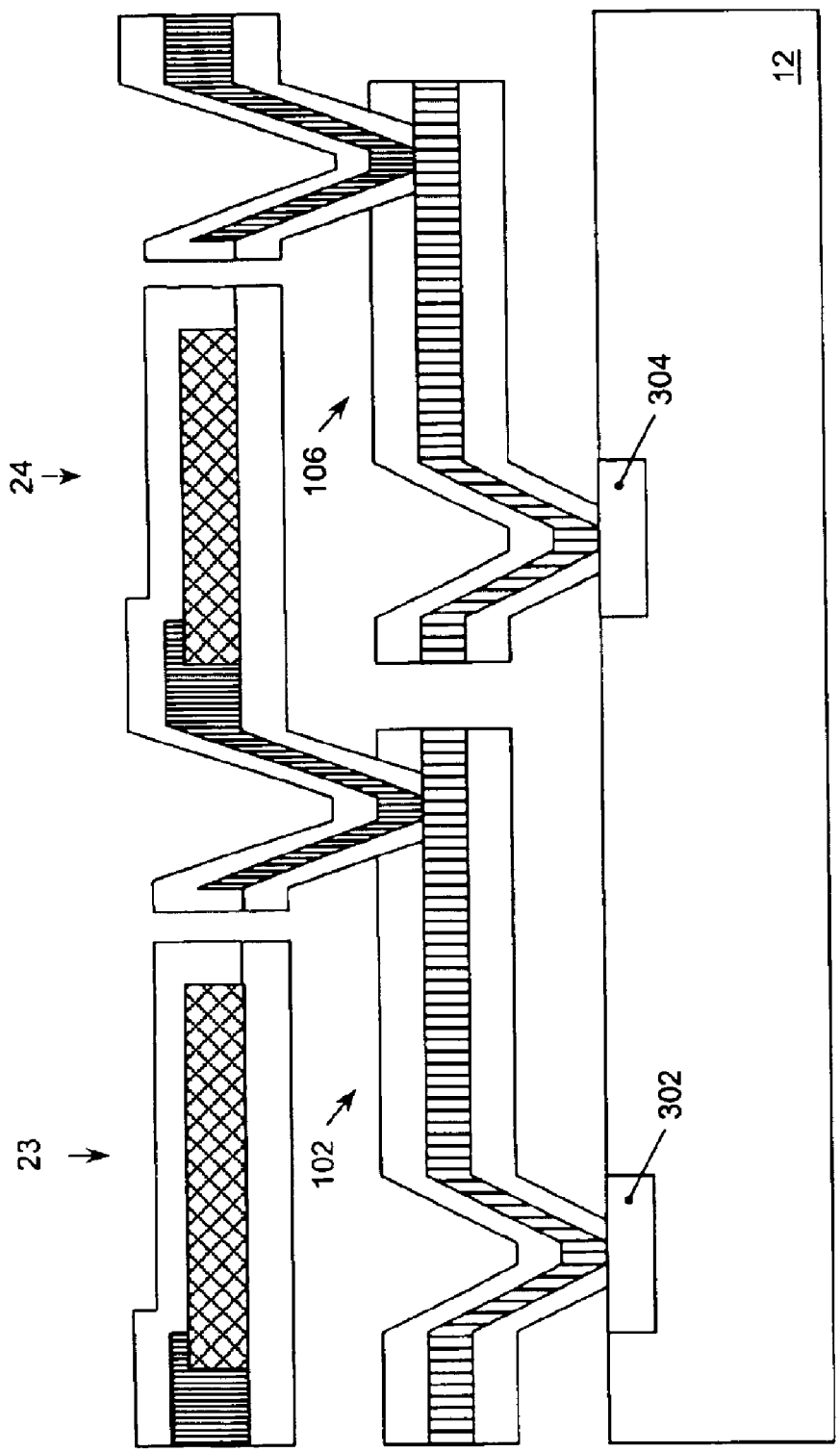

FIGS. 7A–7N illustrate a process of fabricating the microbolometer detector shown in FIG. 3. As shown in FIG. 7A, the process begins with ROIC chip 12 having metal contacts 302 and 304 that are to be connected to transducer units. As shown in FIG. 7B, a polyimide layer 306 is deposited and etched to form vias 308 which open to contacts 302 and 304. A silicon dioxide layer 310, typically 1,000 Å to 2,000 Å in thickness is deposited by plasma-enhanced chemical vapor deposition (PECVD) and etched to form smaller openings to contacts 302 and 304 with a film of silicon dioxide remaining around the walls of vias 308. The resulting structure is shown in FIG. 7C.

Next a nichrome layer 312, typically less than 1,000 Å in thickness is deposited by sputtering, filling the openings to establish contact with contacts 302 and 304, as shown in FIG. 7D, and a second silicon dioxide layer 314, of similar thickness to the first layer 310, is deposited over nichrome layer 312 to form the structure shown in FIG. 7E.

A photoresist mask layer 315 is deposited and patterned with openings 316, as shown in FIG. 7F, and silicon dioxide layers 310 and 314, nichrome layer 312 and polyimide layer 306 are etched via an ion milling process through openings 316. This essentially forms two cantilevers including nichrome layer 312 embedded in silicon dioxide. Mask layer 315 is then removed. A second polyimide layer 318 is deposited, filling openings 316 and yielding the structure shown in FIG. 7G.

A second photoresist mask layer 319 is deposited and patterned to form openings 320, as shown in FIG. 7H. Polyimide layer 318 and silicon dioxide layer 314 are etched through openings 320 exposing the nichrome layer 312. Mask layer 319 is removed.

A third silicon dioxide layer 322 is deposited, coating the openings that have been formed in silicon dioxide layer 314 and polyimide layer 318 but still leaving openings to the nichrome layer 312 and resulting in the structure shown in FIG. 7I. A third photoresist mask layer 323 is deposited. Mask layer 323 is patterned to form openings in which the transducer material 324 is deposited by ion beam deposition as shown in FIG. 7J. The transducer material is vanadium oxide and typically ranges in thickness from 500 Å to 2000 Å. Subsequent to the transducer layer deposition, the photomask layer 323 is removed.

A fourth photomask layer 325 is deposited and patterned to allow a second nichrome layer 326 to be deposited as shown in FIG. 7K. The nichrome deposition techniques and thickness parameters are nominally the same as the first nichrome layer 312. The second nichrome layer 326 provides for the electrical contact between the first cantilevered nichrome layer 312 and the vanadium oxide transducer 324. The photomask 325 is removed.

A fourth silicon dioxide layer 328 is deposited resulting in the structure shown in FIG. 7L.

A final photomask layer 329 is deposited and patterned to allow the delineation of the individual transducing elements. This delineation is performed by ion milling and results in the structure shown in FIG. 7M. The photomask layer 329 is removed.

The final processing step involves the removal of polyimide layers 306 and 318 by dry plasma etching, yielding transducer elements 23 and 24 and leg members 102 and 106, as shown in FIG. 7N.

The embodiments described above are intended to be illustrative and not limiting. Many additional embodiments in accordance with the broad principles of this invention will be obvious to those of skill in the art from the above description.

We claim:

1. A microbolometer detector comprising:
   a readout integrated circuit chip;
   a two-dimensional array of transducer units, each of said transducers containing a transducer having a resistance that varies with temperature; and
   a support structure for supporting said transducer units in a spaced relationship over said chip, said support structure comprising
   at least a first leg and a second leg for supporting a first transducer unit, each of said first and second legs containing an electrical path for connecting said transducer unit to said chip, said first leg extending from a first position on said chip underneath a second transducer unit to a first location on said first transducer unit, said second leg extending from a second position on said chip underneath a third transducer unit to a location on said first transducer unit.

2. The microbolometer detector of claim 1 wherein said second and third transducer units are located adjacent to said first transducer unit.

3. The microbolometer detector of claim 2 wherein said transducer units are arranged in a rectangular array.

4. The microbolometer detector of claim 3 wherein said second and third transducer units are located on opposite sides of said first transducer unit.

5. The microbolometer detector of claim 1 wherein at least a fourth transducer unit is located between said first and second transducer units.

6. The microbolometer detector of claim 5 wherein at least a fifth transducer unit is located between said first and third transducer units.

7. The microbolometer detector of claim 6 wherein said transducer units are arranged in a rectangular array.

8. The microbolometer detector of claim 1 wherein said second and third transducer units are the same.

9. The microbolometer detector of claim 8 wherein at least a fourth transducer unit is located between said first transducer unit and said second and third transducer units.

10. The microbolometer detector of claim 1 wherein the transducer units are for detecting infrared radiation.

11. A microbolometer detector for detecting infrared radiation comprising a focal plane array of transducer units, each of the transducer units being supported by leg members that are attached to an underlying readout integrated circuit chip at locations under at least one transducer unit other than the transducer unit that is supported by the leg members.

* * * * *